US011599767B2

(12) United States Patent
Friedman et al.

(10) Patent No.: US 11,599,767 B2
(45) Date of Patent: Mar. 7, 2023

(54) AUTOMOTIVE VIRTUAL PERSONAL ASSISTANT

(71) Applicant: TOYOTA MOTOR ENGINEERING & MANUFACTURING NORTH AMERICA, INC., Plano, TX (US)

(72) Inventors: Scott A. Friedman, Dallas, TX (US); Prince R. Remegio, Lewisville, TX (US); Tim Uwe Falkenmayer, Moutain View, CA (US); Roger Akira Kyle, Lewisville, TX (US); Ryoma Kakimi, Ann Arbor, MI (US); Luke D. Heide, Plymouth, MI (US); Nishikant Narayan Puranik, Frisco, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 1355 days.

(21) Appl. No.: 15/945,360

(22) Filed: Apr. 4, 2018

(65) Prior Publication Data
US 2019/0311241 A1   Oct. 10, 2019

(51) Int. Cl.
*G06N 3/00* (2006.01)
*G06F 16/951* (2019.01)
(Continued)

(52) U.S. Cl.
CPC ......... *G06N 3/006* (2013.01); *G06F 16/951* (2019.01); *G06N 5/04* (2013.01);
(Continued)

(58) Field of Classification Search
CPC ...... G06V 40/70; G06V 20/593; H04L 67/10; H04L 67/306; G06Q 20/40145; G06F 16/951; G06N 3/006
(Continued)

(56) References Cited

U.S. PATENT DOCUMENTS 5,173,881 A * 12/1992 Sindle ................. G01S 15/931
367/101
6,037,860 A *  3/2000 Zander ................ B60W 30/09
340/436

(Continued)

FOREIGN PATENT DOCUMENTS

JP   2007-216813 A   8/2007
JP   2010-23639 A    2/2010

*Primary Examiner* — Tauqir Hussain
(74) *Attorney, Agent, or Firm* — Oblon, McClelland, Maier & Neustadt, L.L.P.

(57) ABSTRACT

The present disclosure relates to an automotive virtual personal assistant configured to provide intelligent support to a user, mindful of the user environment both in and out of a vehicle. Further, the automotive virtual personal assistant is configured to contextualize user-specific vehicle-based and cloud-based data to intimately interact with the user and predict future user actions. Vehicle-based data may include spoken natural language, visible and infrared camera video, as well as on-board sensors of the type commonly found in vehicles. Cloud-based data may include web searchable content and connectivity to personal user accounts, fully integrated to provide an attentive and predictive user experience. In contextualizing and communicating these data, the automotive virtual personal assistant provides improved safety and an enhanced user experience.

20 Claims, 10 Drawing Sheets

(51) Int. Cl.
| | |
|---|---|
| *G06N 5/04* | (2006.01) |
| *G06Q 20/40* | (2012.01) |
| *G06V 20/59* | (2022.01) |
| *G06V 40/70* | (2022.01) |
| *H04L 67/10* | (2022.01) |
| *H04L 67/306* | (2022.01) |
| *G06N 3/006* | (2023.01) |

(52) U.S. Cl.
CPC ..... *G06Q 20/40145* (2013.01); *G06V 20/593* (2022.01); *G06V 40/70* (2022.01); *H04L 67/10* (2013.01); *H04L 67/306* (2013.01)

(58) Field of Classification Search
USPC ........................................................ 706/11
See application file for complete search history.

(56) References Cited

U.S. PATENT DOCUMENTS

| | | | | |
|---|---|---|---|---|
| 7,018,265 | B2* | 3/2006 | Ghaly | A63H 33/26 |
| | | | | 446/175 |
| 7,880,601 | B2 | 2/2011 | Okezie | |
| 8,232,765 | B2* | 7/2012 | Billmaier | B60L 53/63 |
| | | | | 320/109 |
| 8,502,498 | B2* | 8/2013 | Fecher | B60L 53/63 |
| | | | | 320/109 |
| 8,914,014 | B2 | 12/2014 | Vidal et al. | |
| 9,048,674 | B2 | 6/2015 | Gregg et al. | |
| 9,108,525 | B2* | 8/2015 | Przybylski | B60L 3/00 |
| 9,247,005 | B2* | 1/2016 | Kim | B60K 37/06 |
| 9,348,381 | B2* | 5/2016 | Khoo | B60L 53/67 |
| 9,365,188 | B1 | 6/2016 | Penilla | G06Q 30/00 |
| 9,393,879 | B2* | 7/2016 | Tyagi | B60L 53/63 |
| 9,630,516 | B2 | 4/2017 | Enomoto | |
| 2002/0198632 | A1* | 12/2002 | Breed | G01S 17/86 |
| | | | | 701/472 |
| 2004/0082266 | A1* | 4/2004 | Ghaly | A63H 29/22 |
| | | | | 446/427 |
| 2005/0027402 | A1* | 2/2005 | Koibuchi | B60W 30/1819 |
| | | | | 701/1 |
| 2008/0042813 | A1* | 2/2008 | Wheatley | B60Q 9/008 |
| | | | | 340/439 |
| 2008/0077310 | A1* | 3/2008 | Murlidar | G08G 1/0962 |
| | | | | 701/117 |
| 2008/0228329 | A1* | 9/2008 | Hartman | B60T 8/172 |
| | | | | 701/1 |
| 2010/0123465 | A1* | 5/2010 | Owens | G01R 31/52 |
| | | | | 324/503 |
| 2010/0274570 | A1* | 10/2010 | Proefke | B60L 53/67 |
| | | | | 701/22 |
| 2011/0210866 | A1* | 9/2011 | David | G08G 1/166 |
| | | | | 340/901 |
| 2012/0074770 | A1* | 3/2012 | Lee | B60T 13/662 |
| | | | | 701/70 |
| 2013/0103236 | A1* | 4/2013 | Mehrgan | B60Q 1/00 |
| | | | | 705/13 |
| 2013/0214919 | A1 | 8/2013 | Bassali | |
| 2013/0281079 | A1* | 10/2013 | Vidal | H04W 4/48 |
| | | | | 455/418 |
| 2014/0012448 | A1* | 1/2014 | Tripathi | B60L 53/60 |
| | | | | 320/108 |
| 2014/0028681 | A1 | 1/2014 | Hirayama | |
| 2014/0066053 | A1* | 3/2014 | Burke | H04W 4/00 |
| | | | | 455/426.1 |
| 2014/0200765 | A1* | 7/2014 | Waeller | B60W 50/0098 |
| | | | | 701/36 |
| 2014/0309884 | A1* | 10/2014 | Wolf | B62D 15/0265 |
| | | | | 701/41 |
| 2014/0310001 | A1* | 10/2014 | Kalns | G10L 15/22 |
| | | | | 704/270.1 |
| 2014/0310002 | A1* | 10/2014 | Nitz | G10L 15/1822 |
| | | | | 704/270.1 |
| 2015/0198459 | A1* | 7/2015 | MacNeille | G01C 21/3697 |
| | | | | 701/22 |
| 2015/0224988 | A1* | 8/2015 | Buerkle | B60W 30/0956 |
| | | | | 701/45 |
| 2015/0306969 | A1* | 10/2015 | Sabripour | G06Q 30/00 |
| | | | | 320/109 |
| 2016/0104486 | A1* | 4/2016 | Penilla | G10L 15/02 |
| | | | | 704/232 |
| 2016/0218933 | A1* | 7/2016 | Porras | H04L 41/147 |
| 2016/0219048 | A1* | 7/2016 | Porras | H04L 63/20 |
| 2016/0219078 | A1* | 7/2016 | Porras | H04L 45/02 |
| 2016/0275798 | A1* | 9/2016 | Maytal | G08B 21/187 |
| 2016/0307432 | A1 | 10/2016 | Downs | |
| 2017/0169823 | A1* | 6/2017 | Neff | G10L 15/22 |
| 2019/0287080 | A1* | 9/2019 | Penilla | G06F 9/00 |

\* cited by examiner

AUTOMOTIVE VIRTUAL PERSONAL ASSISTANT

BACKGROUND

As internet-connected devices are now ubiquitous, the development of technology focused at the mobile user has rapidly accelerated. Nowhere, in recent years, is this more evident than the automobile as manufacturers seek to provide users with an improved and connected experience. Currently, vehicles are capable of ascertaining the status of various sensors placed throughout the vehicle cabin and on the exterior of the vehicle, enabling generic identification of an open window, an unfastened seatbelt, the distance between vehicles, etc. In some vehicles, an advanced driver assistant system can aid the driver with dynamic cruise control, lane change assist, and blind spot detection, utilizing sensors on the exterior of the vehicle to enhance passenger safety while destressing the driving experience. Often existing in parts if at all, an improved and fully integrated automobile able to provide an automotive virtual personal assistant that is responsive and proactive to user and vehicle demands remains elusive. U.S. Publication No. 2015/0306969 entitled "Automotive Recharge Scheduling Systems and Methods" by Sabripour describes a system for receiving a user input from a microphone and, through cloud-based interactions, scheduling a vehicle event with the user.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a system configured to serve as an automotive virtual personal assistant. The system is responsive to a user's vocal, visual, or tactile commands. Additionally, the system proactively initiates interaction with the user when appropriate. When pertinent, the system is configured to ascertain the cognitive load environment of the user and control the flow of information to the user, accordingly. The system can also be configured to interpret customer preferences and interact with the user in the context of stored user data.

The present disclosure also relates to a system configured to evaluate the user environment inside and outside the vehicle in the context of learned experiences and to predict future user actions such that appropriate aid or advanced notification may be provided.

The present disclosure further relates to a system configured to authorize charges following confirmation of user identity.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Figure 1:
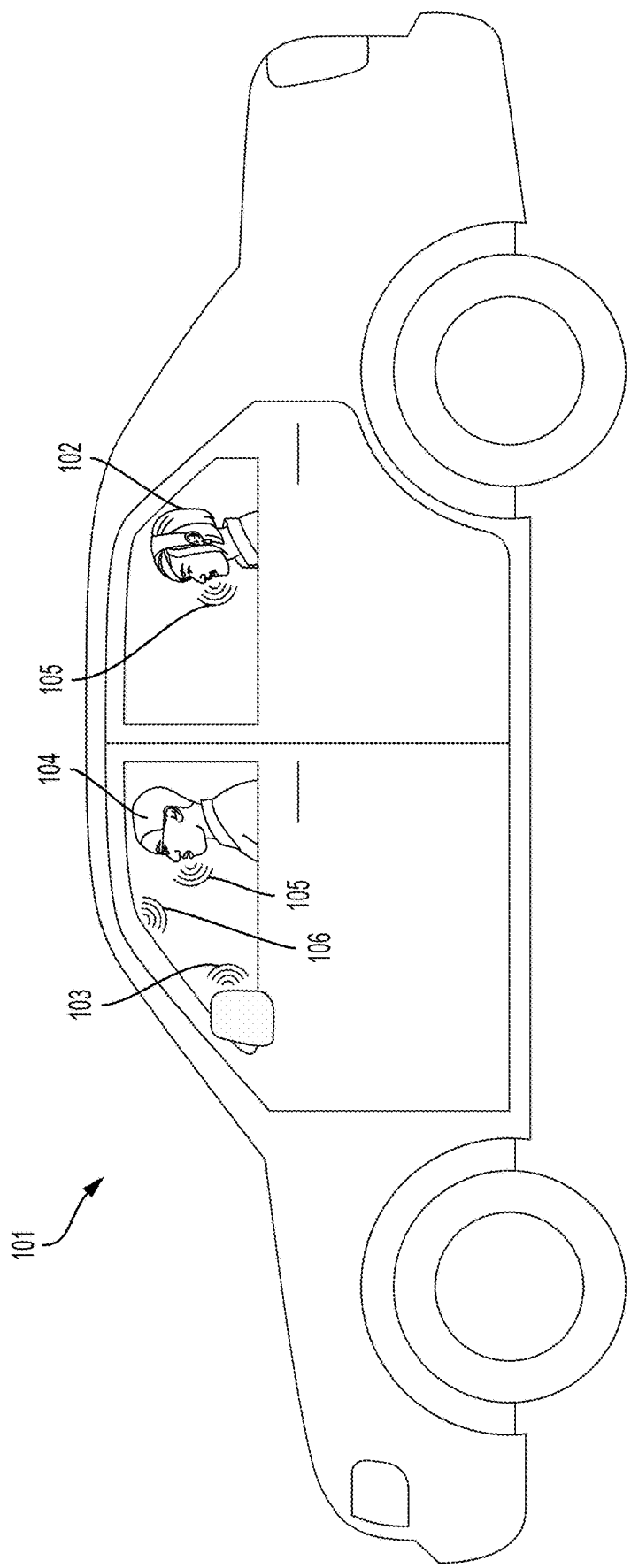
FIG. 1 is a profile view of a vehicle occupied by two users: a driver and a passenger.

FIG. 1 illustrates an embodiment of a vehicle 101 with a driver 104 and a rear passenger 102. In other embodiments, a range of passengers are in the vehicle between the minimum number and the maximum number as defined by the vehicle manufacturer. In this embodiment, the driver 104 and/or the rear passenger 102 interact with an automotive virtual personal assistant (AVPA) 106 via vocal, visual, and tactile input 105. The AVPA 106 communicates with vehicle users via audio or visual output 103.

Figure 2:
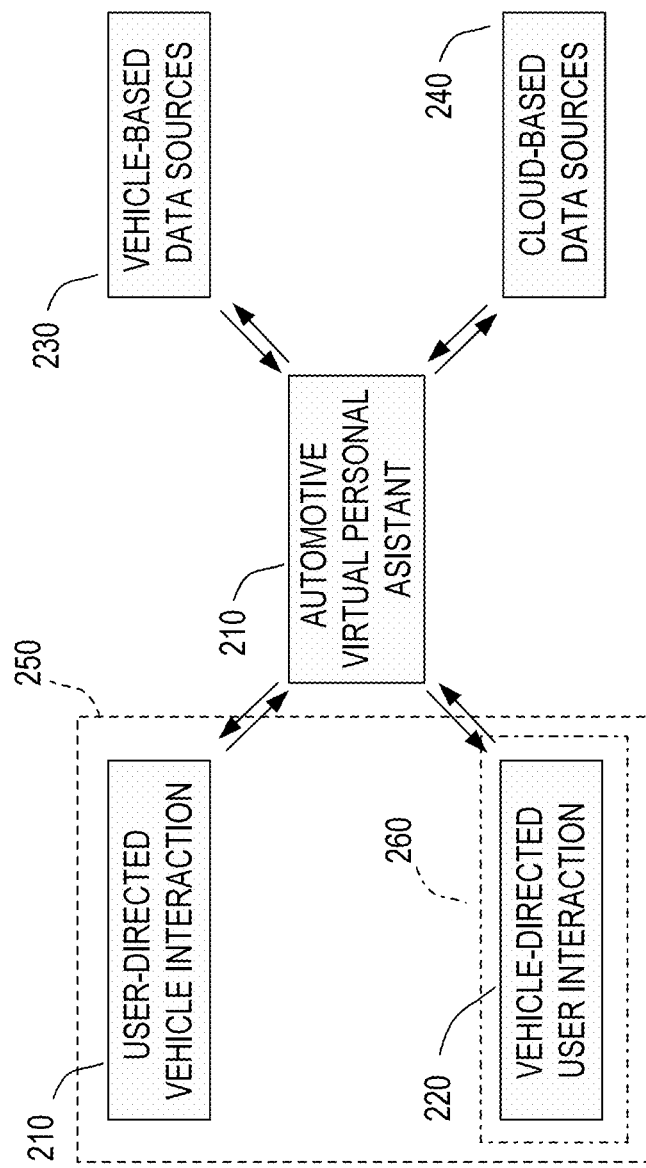
FIG. 2 is an organizational chart outlining the core functions of an automotive virtual personal assistant.

FIG. 2 provides an architectural diagram for an AVPA 210. The AVPA 210 is comprised of a combination of hardware control circuitry, firmware and high-level software, vehicle-based and cloud-based, configured to utilize artificial intelligence approaches including machine learning. The AVPA 210 is further configured to send and receive data with a combination of hardware, including vehicle-based sensors, via equipment typically used for wireless communication (e.g. encoders, transmitters, receivers). The interactions typical of the AVPA 210 are described by (1) user-directed vehicle interaction 210 and (2) vehicle-directed user interaction 220. The dashed lines encompassing both user-directed vehicle interaction 210 and vehicle-directed user interaction 220 indicate a listening embodiment 250 of the AVPA 210. The dashed and dotted lines encompassing only vehicle-directed user interaction 220 indicate a notification embodiment 260 of the AVPA 210. The listening 250 and notification 260 embodiments rely on data from one or more vehicle-based data sources 230 and/or cloud-based data sources 240. Further, the listening 250 and notification 260 embodiments described herein, and detailed in FIG. 3, can be deployed in isolation or interdependently.

At each level, the AVPA 210 is configured to deploy multiple artificial intelligence approaches, including natural language processing and machine learning, to understand, learn and predict user preferences. To communicate with vehicle-based data sources 230, the AVPA 210 is configured to obtain data by any of a variety of wireless communication means (e.g. cellular networks). The AVPA 210 is further configured to obtain data from cloud-based data sources 240, including a variety of servers containing relevant information (i.e., file servers, web servers), by implementations of client-server systems as typified by a request-response model.

In an exemplary listening embodiment 250 of user-directed vehicle interaction 210, the AVPA 210 is prompted by a specific user request and responds, accordingly, in context of data available from one or more vehicle-based data sources 230 and cloud-based data sources 240. In another exemplary listening embodiment 250 of vehicle-directed user interaction 220, the AVPA 210 observes audio and visual data from inside the cabin of the vehicle during unprompted sequences, constructing a knowledge graph of user preferences in the context of one or more vehicle-based 230 and cloud-based data sources 240, and interacting with the user, accordingly. In an exemplary notification embodiment 260 of vehicle-directed user interaction 220, the AVPA 210 is configured to evaluate vehicle state variables (from one or more vehicle-based data sources 230) in the context of the internal and external environment of the vehicle and notify the driver if pertinent to vehicle safety or function. In another exemplary notification embodiment 260 of vehicle-directed user interaction 220, the AVPA 210 is configured to receive user-specific information from one or more cloud-based data sources 240, evaluating information from one or more vehicle-based data sources 230, and determining an appropriate time to notify the user of the cloud-based, user-specific information.

Figure 3A:
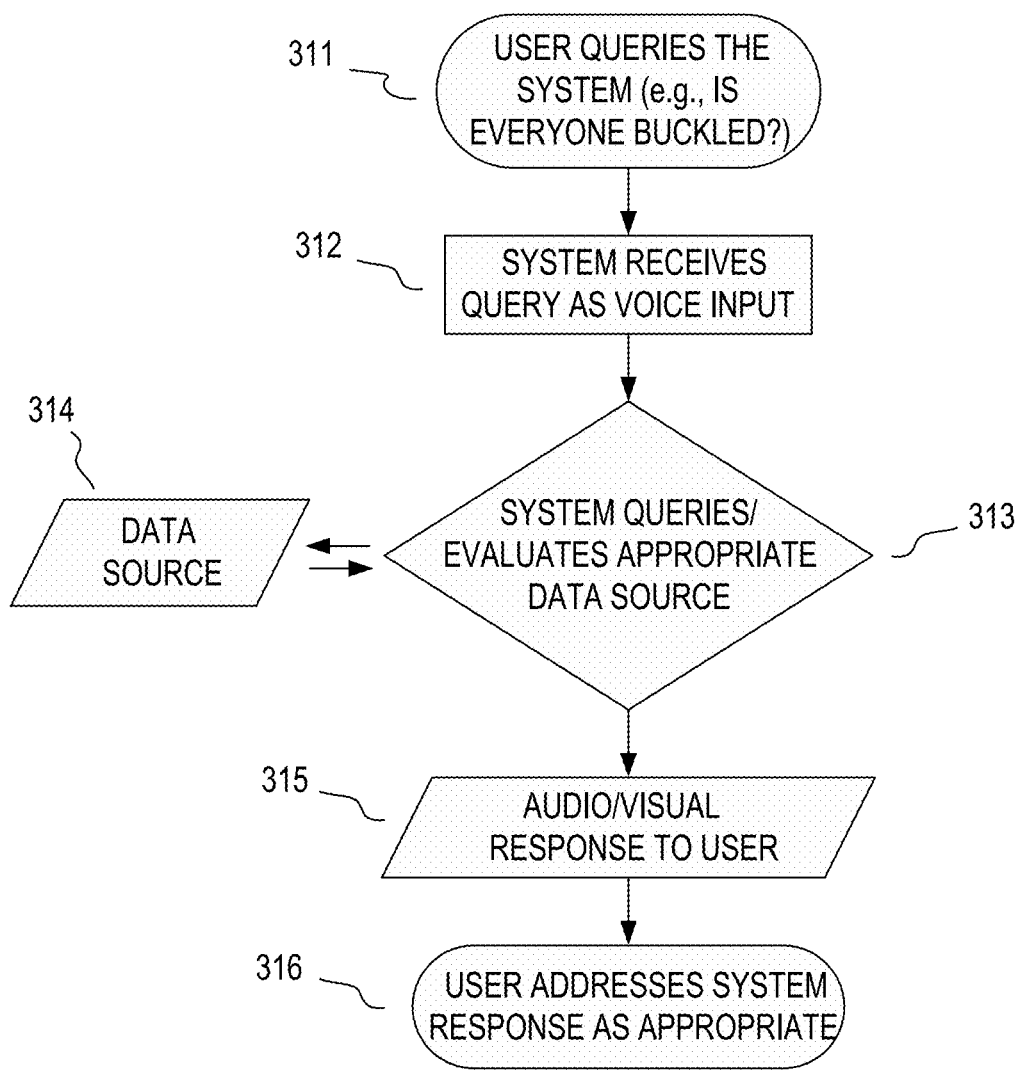
FIG. 3A is a process flowchart of an embodiment of user-directed vehicle interaction.

FIG. 3A provides a process workflow of an embodiment of user-directed vehicle interaction 310. In an embodiment, a user may provide a verbal "wake up phrase" or expression to the vehicle such as, for example, 'Is everyone buckled?' 311. This "wake up phrase" is one of a plurality of "wake up phrases" designated by the user. Following reception of a query from a user 312, the AVPA queries and evaluates data 313 from one or more appropriate sources 314. In an exemplary embodiment, this data is generated by one or more sensors inside and outside the cabin of the vehicle, including but not limited to, seatbelt sensors, pressure sensors, tactile sensors, car seat sensors, carbon dioxide sensors, temperature sensors, radar, visible spectrum cameras, infrared cameras, and microphones. Following evaluation of data 313 from the one or more appropriate data sources 314, the AVPA generates an audio and/or visual response to the user 315. Following receipt of the response, the user addresses the query as appropriate 316 or continues engagement with the AVPA via vocal or tactile input.

In another embodiment, the "wake up phrase" 311 may be related to the inside of the cabin, for example, 'Are the children buckled?' The AVPA receives the query from the user 312 and queries data 313 from one or more appropriate sources 314, in this embodiment, both vehicle-based data sources 330 and cloud-based data sources 340. Using queried data, the AVPA determines the presence of children in the vehicle (from images acquired by vehicle-based cameras contextualized with an image database containing typical child features), recognizes that the children are in the rear of the vehicle, and evaluates 313 the current status of their seat belts, accordingly. Following determination of the status of the seat belts, the AVPA generates an audio and/or visual response 315 to the user such as, 'The child in the rear right passenger seat is not buckled.' The user, heretofore focused on safe operation of the vehicle, may then address this issue 316 with the child when safe or continue engagement with the AVPA via vocal or tactile input.

In another embodiment, the "wake up phrase" 311 may be 'I need gas.' The AVPA receives the query 312 from the user and queries data 313 from one or more appropriate sources 314, in this situation both vehicle-based and cloud-based data sources. Evaluating real-time and stored data 313 from vehicle-based data sources pertaining to fuel level and cloud-based data sources pertaining to fuel station location and preference, the AVPA provides a recommendation to the user in the form of an audio and/or visual response 315. The user then appropriately addresses the response 316 or continues engagement with the AVPA via vocal or tactile input. Exemplary of this embodiment, the AVPA is configured to recommend to a user 'Based on your current fuel level and average fuel consumption rate, you will be able to travel 15 miles before empty. The nearest ENERGY fuel station is 3 miles away. Would you like directions?' The "ENERGY" fuel station described above, and in subsequent paragraphs, is meant to represent one of a number of branded fuel stations, reflecting user preference for a specific fuel company, as determined by the AVPA from stored data in cloud-based data sources (e.g. user accounts, payment history). The user can then address the AVPA recommendation as appropriate 316, either via vocal or tactile input. In another example of this embodiment, in response to a "wake up phrase", 'Get me directions to Charleston.' 311, the AVPA queries one or more cloud-based data sources 313 related to navigation (i.e. web searchable content), evaluates queried data 314, and provides route options to the user visually, audibly, or as a combination thereof 315. After selecting a preferred route 316, the user becomes aware of the need to refuel the vehicle. Querying the vehicle again, 'I need gas.' 311, the AVPA queries one or more data sources 313 related to fueling stations and customer preference, evaluates the queried data 314, and provides a recommendation to the user audibly, visually, or as a combination thereof 315. Cognizant that the user is traveling on a specific route, the AVPA recommends 315 'Based on your current fuel level and average fuel consumption rate, you will be able to travel 15 miles before empty. In 5 miles, there is an ENERGY fuel station 0.5 miles from your current route. Would you like directions?' Combining data from a plurality of sources 314, the AVPA has provided a recommendation 315 to the user, mindful of navigational routes, mappings, and customer preferences regarding fuel station. The user then responds, as appropriate 316, or continues engagement with the AVPA via vocal or tactile input.

Figure 3B:
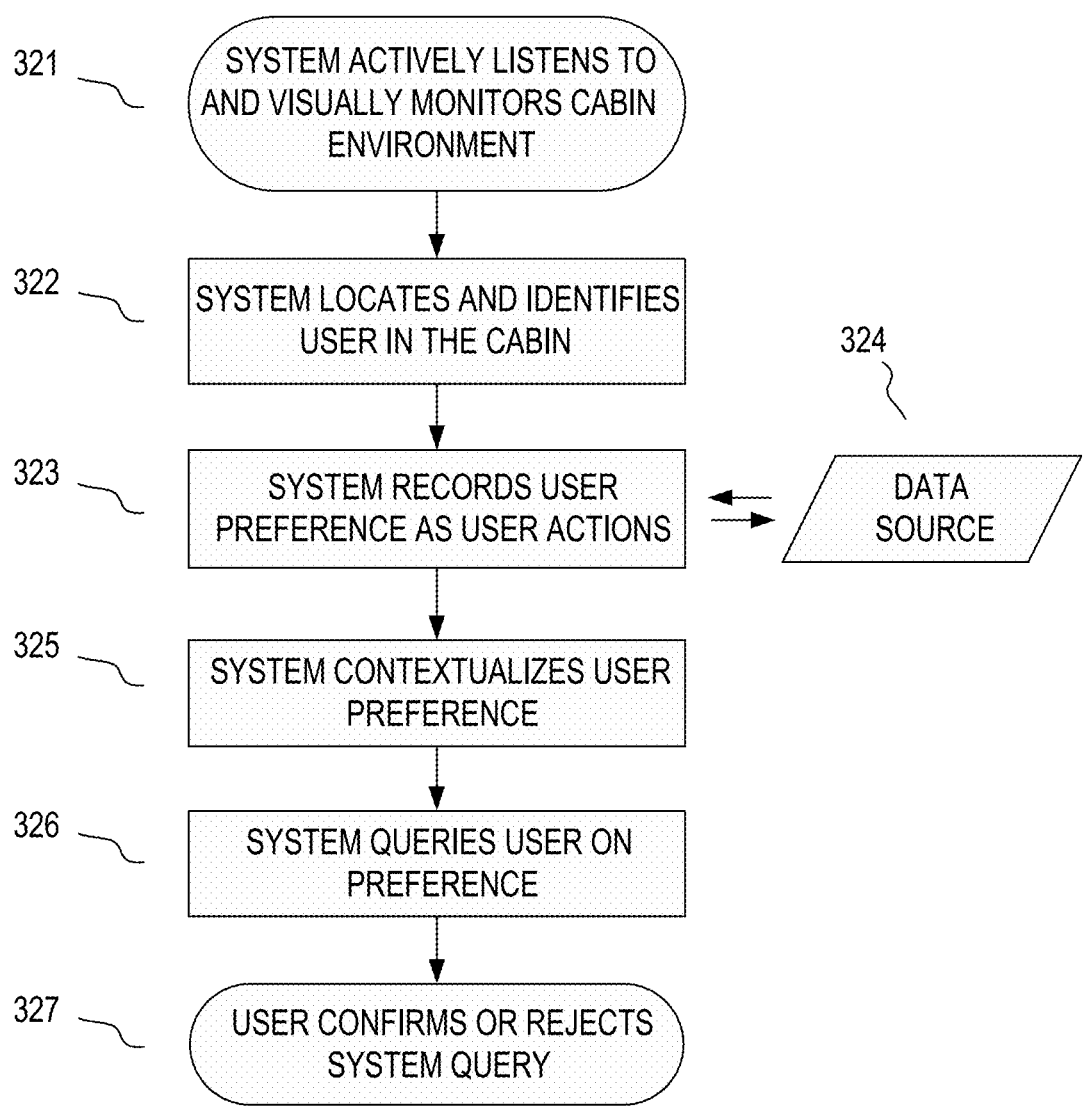
FIG. 3B is a process flowchart of an embodiment of vehicle-directed user interaction.

FIG. 3B provides a process workflow of an embodiment of vehicle-directed user interaction 320. In an embodiment, the AVPA actively listens to and visually monitors the cabin environment 321, locating and identifying users 322 when present. As a user performs ordinary tasks within a vehicle, the AVPA monitors and records user actions 323. In developing a knowledge graph of user interactions with the vehicle, the AVPA interacts with one or more vehicle-based and cloud-based data sources 324 to contextualize user actions and determine user preferences 325. This knowledge graph, and the resulting user preferences, reflects implementation of machine learning algorithms, including pattern recognition, to predict future events in the context of historical events. To improve predictive value, including for events when minimal personal user data is available, the AVPA can leverage universal user data (e.g. aggregate data from a group of users), in addition to personal user data, as context for future events. After determining user preference, the AVPA predicts user actions and recommends to the user a specific action 326. The user will address the recommendation of the AVPA 327 as appropriate, or continue engagement with the AVPA via vocal or tactile input. Further, the user response is appended to a cloud-based history of user-vehicle interactions to be used as context for subsequent events.

In one embodiment, the AVPA locates and identifies a user in the cabin 322. The user begins a conversation with another passenger or via mobile phone. In communication with one or more vehicle-based data sources, the AVPA listens to and parses the conversation 323. Combining this vehicle-based data with one or more cloud-based data sources 324, the AVPA begins to contextualize user preferences 325. In an exemplary embodiment, a user, in conversation with another passenger says, 'I should give Gunnar a call next week.' The AVPA, having recognized the user and the user's intention, will evaluate one or more cloud-based data sources to determine if and on what days the user is available 325. Through audio and/or visual means, the AVPA can query the user 'You are available on Tuesday to call Gunnar. Would you like me to schedule the call?' 326. The user will address this request in accordance with their interest 327 or continue engagement with the AVPA via vocal or tactile input.

In another embodiment, the AVPA locates and identifies a user in the cabin 322. The user is engaged in normal tasks related to operating a vehicle, including music selection. The AVPA, utilizing one or more vehicle-based data sources and cloud-based data sources 324, determines and records the user's mood state from visible spectrum cameras 323. Further, utilizing one or more vehicle-based data sources 324, the AVPA identifies a genre of music 323 of interest to the user at a specific time based on, for example, current music selection. Contextualizing these two data streams, the AVPA predicts the musical preference of the user while in a specific mood state 325. In an exemplary embodiment, a user enters their vehicle after an exhausting day of work. The AVPA locates and identifies the user 322, noting the exhausted mood state of the user and the user's choice of music 323. Having developed an understanding of the user's preference in specific mood states 325 from the knowledge graph of their personal, cloud-based user history, the AVPA will subsequently predict and recommend 326 the next song to be played, for example, 'Would you like to listen to "Tupelo Honey" by Van Morrison?' The user will address the AVPA's recommendation, as desired 327, or continue engagement via vocal or tactile input.

Figure 3C:
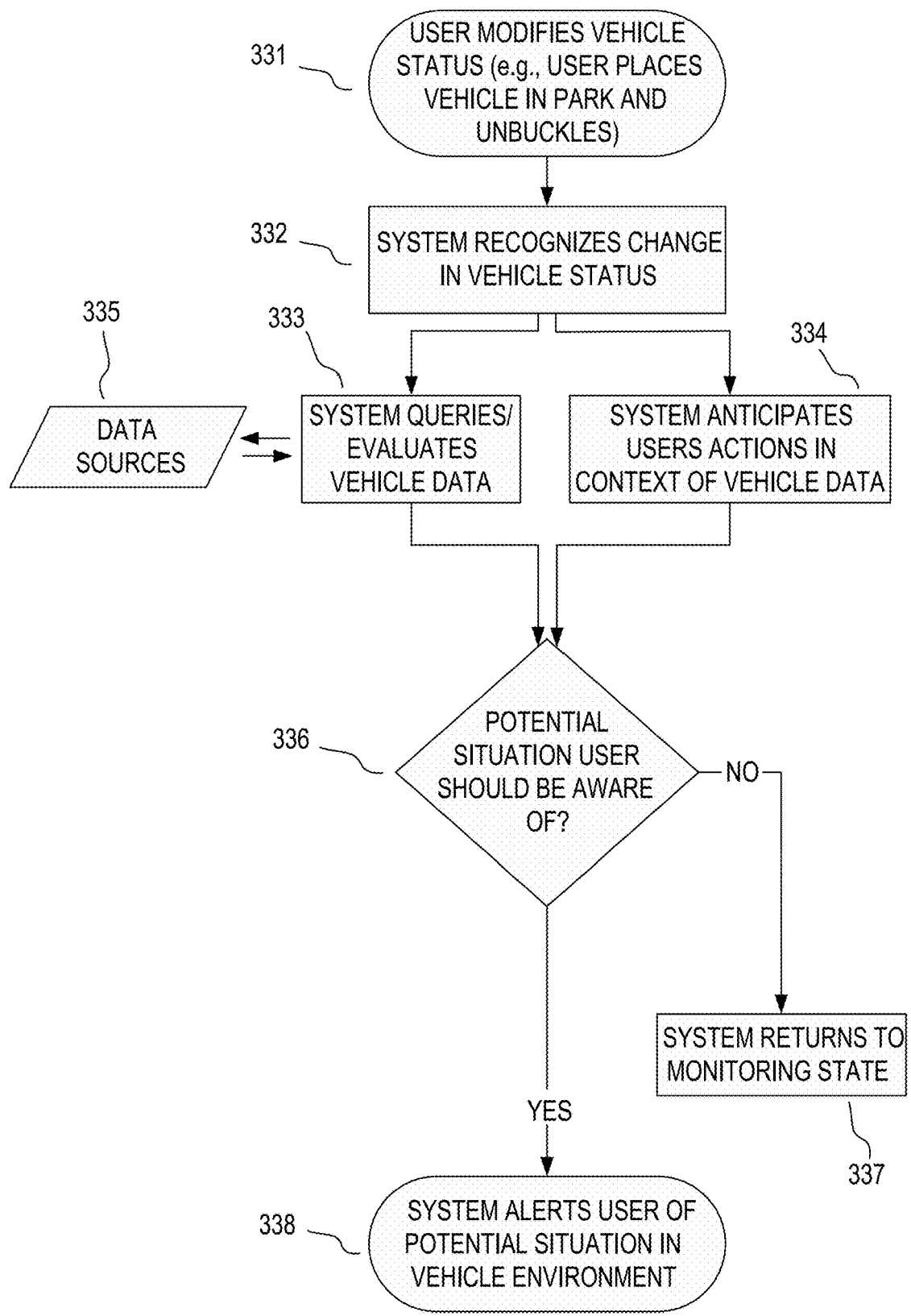
FIG. 3C is a process flowchart of an embodiment of vehicle-directed user interaction.

FIG. 3C provides a process workflow of an embodiment of vehicle-directed user interaction 320. In an embodiment, the AVPA recognizes a change in vehicle status 332, either the result of a user-independent system modification or the result of a user modifying the status of the vehicle 331 (e.g., placing the vehicle into drive). Upon recognition of the change 332, the AVPA simultaneously queries 333 one or more vehicle-based data sources and cloud-based data sources to evaluate the current state of users and the vehicle 335 and anticipate users' actions in the context of the current state of the vehicle 334. If the AVPA identifies a potential situation 336 that the user should be made aware of in the context of current state variables 333 and predicted user actions 334, the AVPA will provide an audio and/or visual notification to the user 338. If no notification is necessary, the AVPA will return to a monitoring state 337. In an exemplary embodiment, a user has placed a vehicle in park and unbuckled their seatbelt 331. A child, in the rear of the vehicle, is still buckled. Simultaneously, the AVPA recognizes this change in vehicle state 332 and queries 333 state variables of the vehicle 335, anticipating the next action of the user 334. In this embodiment, the AVPA recognizes that the next most likely action by the user is to exit the vehicle. However, upon exiting the vehicle, the user neglects to remove the child from the rear of the vehicle. Having queried seat belt sensors and determined that a child is still in the rear of the vehicle 333 via vehicle-based data sources 335, the AVPA determines that the user should be notified 336 of the error and an alert is given 338.

In an additional embodiment, the AVPA recognizes 332 a modification 331 to the vehicle that is independent of user action. In this exemplary embodiment, the vehicle, querying 333 both vehicle-based and cloud-based data sources 335, recognizes that pressure in the back left tire has dropped to a level below the recommended pressure range for the tire. Having determined the user should be notified 336, the AVPA provides a verbal notification to the user of the need to address the tire pressure.

Figure 3D:
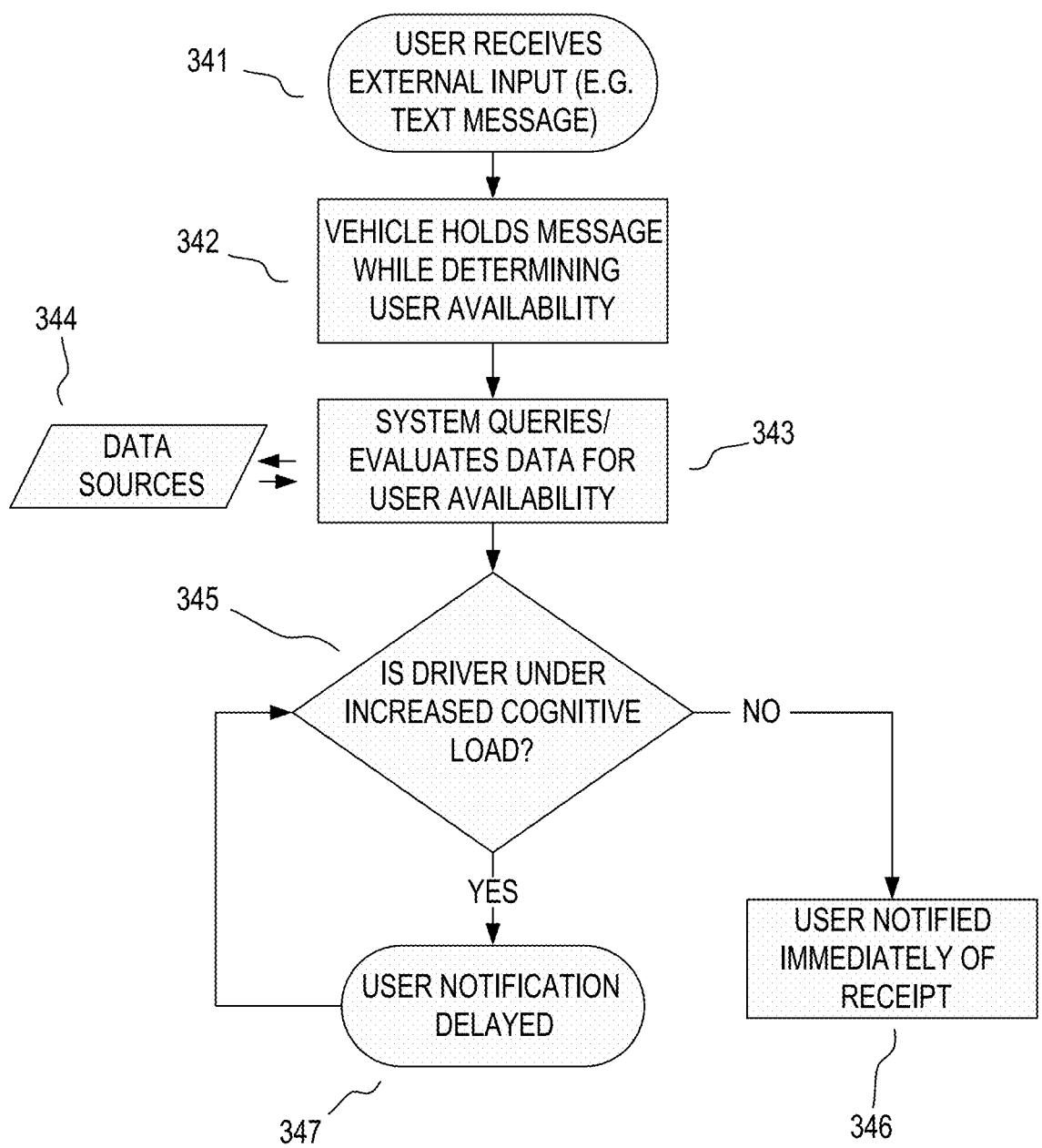
FIG. 3D is a process flowchart of an embodiment of vehicle-directed user interaction.

FIG. 3D provides a process workflow of an embodiment of vehicle-directed user interaction 320. In an embodiment, a user receives an external input 341 as routed through the AVPA. The AVPA delays the message while determining user availability 342. To determine user availability, one or more vehicle-based and cloud-based data sources 344 are queried to determine the current cognitive load of the user 343. If the user is under increased cognitive load 345, the external input is delayed 347 until the cognitive load of the user is reduced below a threshold level. If the cognitive load of the user is below a threshold level, the external input is transmitted to the user 346. In an exemplary embodiment, a user is navigating traffic during a rush hour commute. The user receives a text message 341 from a friend. The AVPA delays the text message while determining if the user is under increased cognitive load 342. Querying data 343 from one or more vehicle-based and cloud-based data sources 344, such as current speed, traffic density, facial expressions, and anticipated traffic conditions, the APVA determines the user's current cognitive load is elevated, due to the increased traffic 345. Because the user is under increased cognitive loads, the message is delayed to the user 347 until conditions improve. To this end, the AVPA actively monitors user cognitive load 345 until the load falls below a predetermined threshold 345, at which time the user is notified of the contents of the text message 346.

While discussed as related to a single user, the above FIGS. 3A, 3B, 3C, and 3D are not limited to generic notifications of vehicle or user status. Using data gathered from one or more vehicle-based and cloud-based data sources, such as voice and facial recognition or other biometrics of users with established user accounts, it is possible to provide user specific assistance for a plurality of users.

For example, in an exemplary embodiment, the driver of a vehicle, Valerie, asks her APVA 311 regarding her son, 'Is Prince buckled?' The APVA recognizes the speaker both audibly and visually as Valerie 312 and begins to query 313 one or more vehicle-based and cloud-based data sources 314 to determine (1) voice and facial signatures of her son, Prince, (2) if Prince is in the vehicle, (3) the location of Prince in the vehicle, and (4) if Prince's seat belt is buckled. The APVA utilizes visual spectrum camera and microphone data to locate and identify Prince in the right rear passenger seat of the vehicle. Further, the right rear passenger seat belt transducer is queried to determine if Prince's seat belt is engaged. Having determined that Prince's seat belt is fastened, the AVPA will provide a verbal response to Valerie's query 'Yes, Valerie. Prince's seat belt is buckled.'

In another exemplary embodiment, where multiple account users are in the vehicle, the AVPA may be controlled by a user other than the driver. For example, Scott is driving a vehicle with his friend, Luke. Luke decides that he'd like to listen to music but hasn't decided on an artist. Luke asks the AVPA, 'I'd like to listen to music. Can you play something mellow?' 311. The AVPA locates and identifies the requesting passenger 312 utilizing one or more vehicle-based and cloud-based data sources 314. Further, the AVPA tailors a music playlist to Luke's personal preferences based on a knowledge graph of user data from his personal, cloud-based user history. The AVPA responds 315 'Luke, I've put together a playlist of jazz music for you based on music by John Coltrane. Would you like to hear it?', and Luke responds 316, as appropriate, via vocal or tactile input.

In another exemplary embodiment, where a family is traveling on vacation in a vehicle, the APVA is actively monitoring the cabin environment. One of the children, Darius, says to his parents, 'I'm hungry.' Using one or more vehicle-based and cloud-based data sources, the APVA locates and identifies the voice, interprets the input in the context of user preferences (e.g. favorite restaurant), and recommends to the vehicle 'In 10 minutes, I've located a McDonald's 1 mile off your route. Would you like directions?' Darius's parents can then respond to the APVA, as appropriate, or continue engagement via vocal or tactile input.

Figure 4:
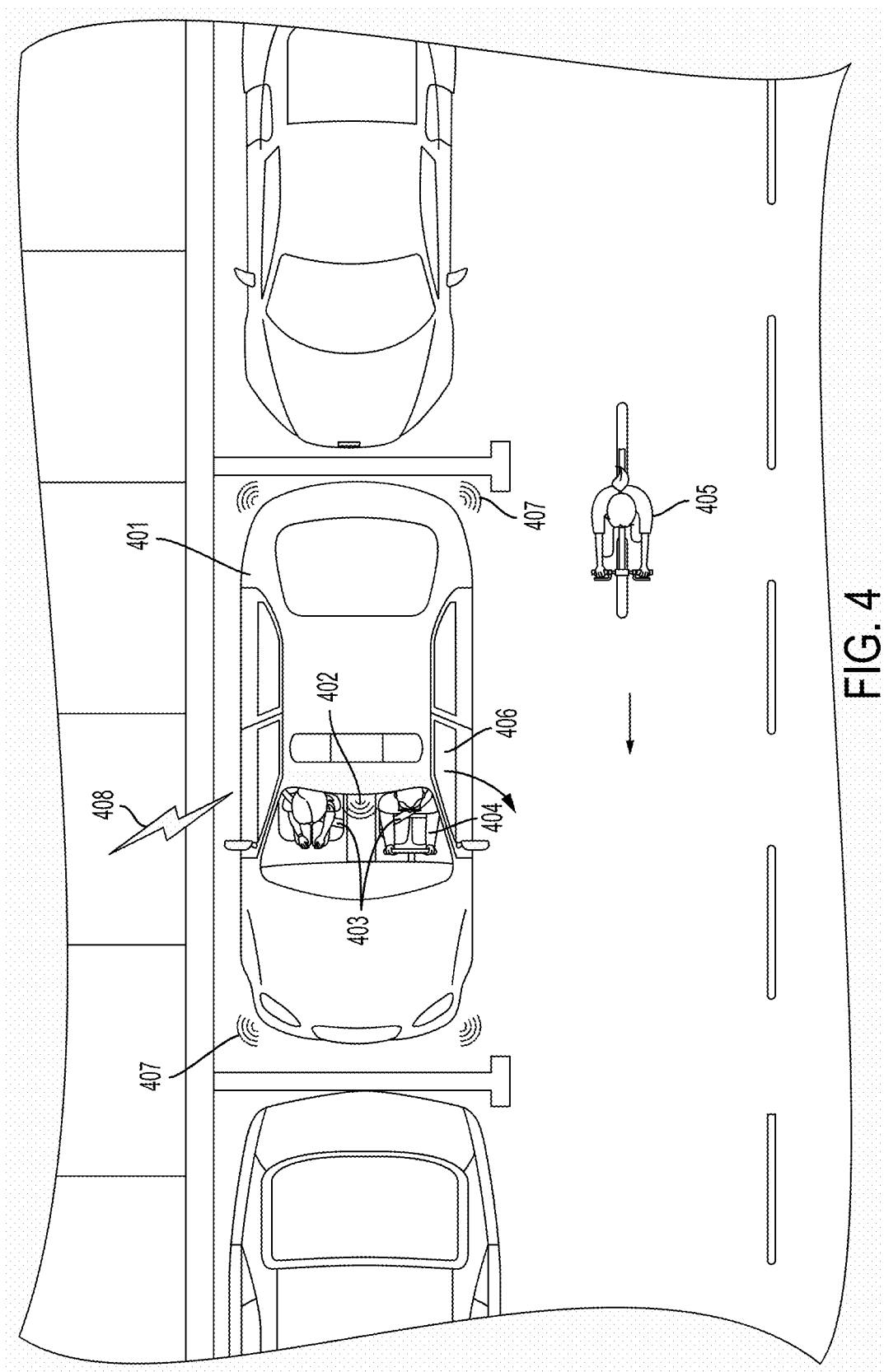
FIG. 4 is an illustration of an embodiment of an automotive virtual personal assistant interacting with the user interdependently via user-directed and vehicle-direct interaction.

FIG. 4 is an illustration of an embodiment of the automotive virtual personal assistant during a ride in which user interaction with the AVPA is initiated by both the user and the vehicle, thus demonstrating the interdependence of the above embodiments. In an exemplary embodiment, a vehicle 401 user, Tim 404, is riding with a friend. In conversation, Tim 404 suggests that they give another friend, Nishikant, a call and ask if he would like to join them for lunch. The AVPA identifies the speaker according to voice and facial biometric data from one or more vehicle-based data sources 402, contextualizes the conversation (integrating one or more cloud-based data sources 408) and asks the user, 'Tim, would you like to call Nishikant and schedule lunch?' Tim 404 agrees, the AVPA places the call, and Nishikant agrees to meet them, recommending Different Café. When the call ends, Tim 404 asks the AVPA, 'Hey Car. Can you get us directions to Different Café?' Alerted by the "wake-up phrase", the AVPA determines the fastest route to Different Café and notifies the user, 'Tim, I've located Different Café in Santa Monica, Calif. Would you like to proceed to the route?' Tim 404 answers in the affirmative and the AVPA provides turn-by-turn directions to Different Café. Because of heavy traffic, Tim 404 is late for lunch. Nishikant sends Tim 404 a text message to let him know that he is already at Different Caféand has a table for three. The AVPA, recognizing Tim's 404 increased cognitive load, as determined from one or more vehicle-based 402 and cloud-based data sources 408 (e.g., external visible spectrum cameras 407, radar, and knowledge of predicted roadway conditions), delays delivery of the message to Tim 404 until his cognitive load decreases. Having reached Different Café and parallel parked, the AVPA releases the text message to Tim 404. Having now read the message and in a rush to the café, Tim 404 unbuckles his seatbelt 403 and unlocks the door 406. External vehicle-based data sources 407 identify a bicycle rider 405 approaching the driver's side of the vehicle 401. Recognizing that Tim 404 has unbuckled his seatbelt 403 and unlocked the door 406, the AVPA predicts that Tim 404 will next open the door 406 and alerts him audibly 'Tim, there's a bicycle approaching on the left side of the vehicle.' Alerted, Tim 404 allows the bicycle rider 405 to pass by the vehicle before opening the driver side door 406. The above exemplary embodiment describes the integrated nature of the AVPA as it engages with the user in a user-directed and a vehicle-directed way, utilizing both vehicle-based and cloud-based data sources.

Figure 5A:
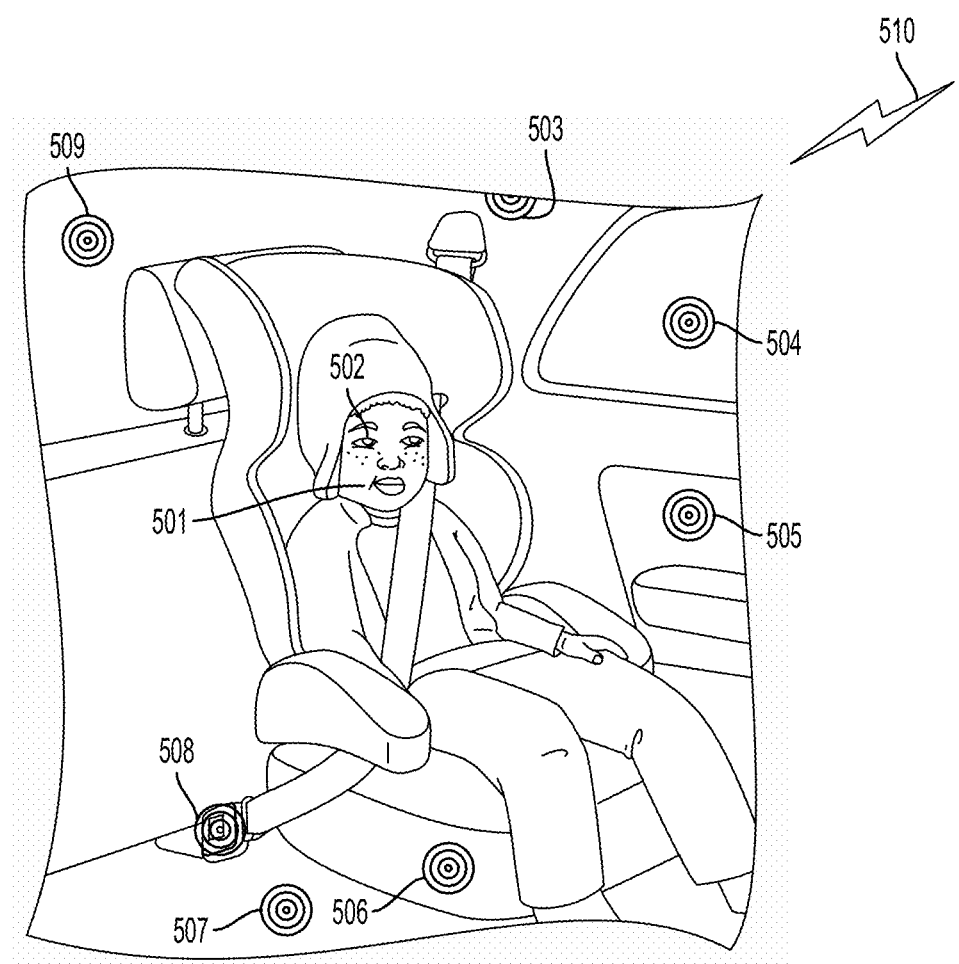
FIG. 5A is an illustration of a passenger in the rear of the cabin.

FIG. 5A provides an exemplary illustration of a passenger in the rear of a vehicle and the vehicle-based and cloud-based data sources that may be accessible to the AVPA in the cabin. The AVPA cross-references one or more vehicle-based data sources such as audio and video from visible spectrum cameras, infrared cameras, and microphones 503 with user biometric signatures confirmed in one or more cloud-based data sources 510 to perform voice 501 and facial recognition 502 to determine the identity of the user and provide a personalized experience. If user identity cannot be determined (e.g. no user account exist), the cameras and microphones 503, along with pressure sensors 507 within the seat cushion, provide generic, directionally-specific information (e.g. the child in the rear left passenger seat). Further, a user may query the AVPA regarding the status of windows 504 and door locks 505, the security of a car seat 506, and the use of seatbelts 508 in the rear of the vehicle. In the event that a child has been left in the vehicle and the user was not previously notified, a carbon dioxide sensor 509 communicates data via wireless communication technology to the AVPA. The AVPA is configured to evaluate the data and notify the user of the oversight.

Figure 5B:
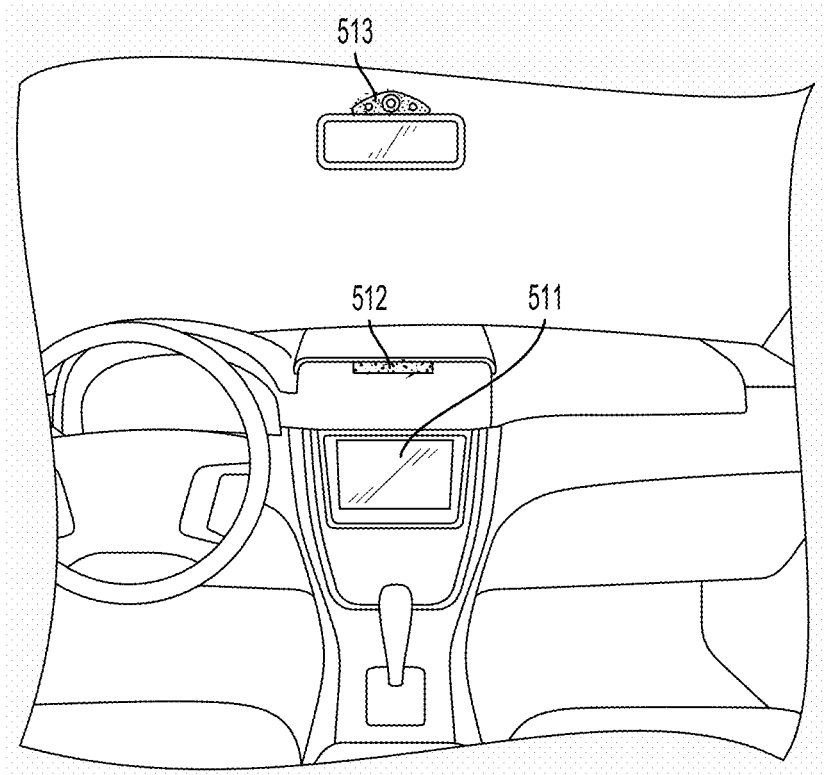
FIG. 5B is an exemplary illustration of the location of a subset of vehicle-based sensors and displays in the fore of the cabin.

FIG. 5B is an exemplary illustration of one embodiment of the location of one or more audio and video inputs and outputs available to the AVPA in the fore of the cabin. The AVPA utilizes data from one or more audio and video inputs 513 to make either user-directed or vehicle-directed determinations on the status of the vehicle. Following this determination, the AVPA notifies the user via audio 512 or visual 511 outputs.

With regards to the vehicle described in the foregoing discussion, it should not be implied that the vehicle in reference is limited to one with an internal combustion engine, of the kind typified by a gasoline engine. Vehicle type is not limiting in the application of the disclosure.

Figure 6:
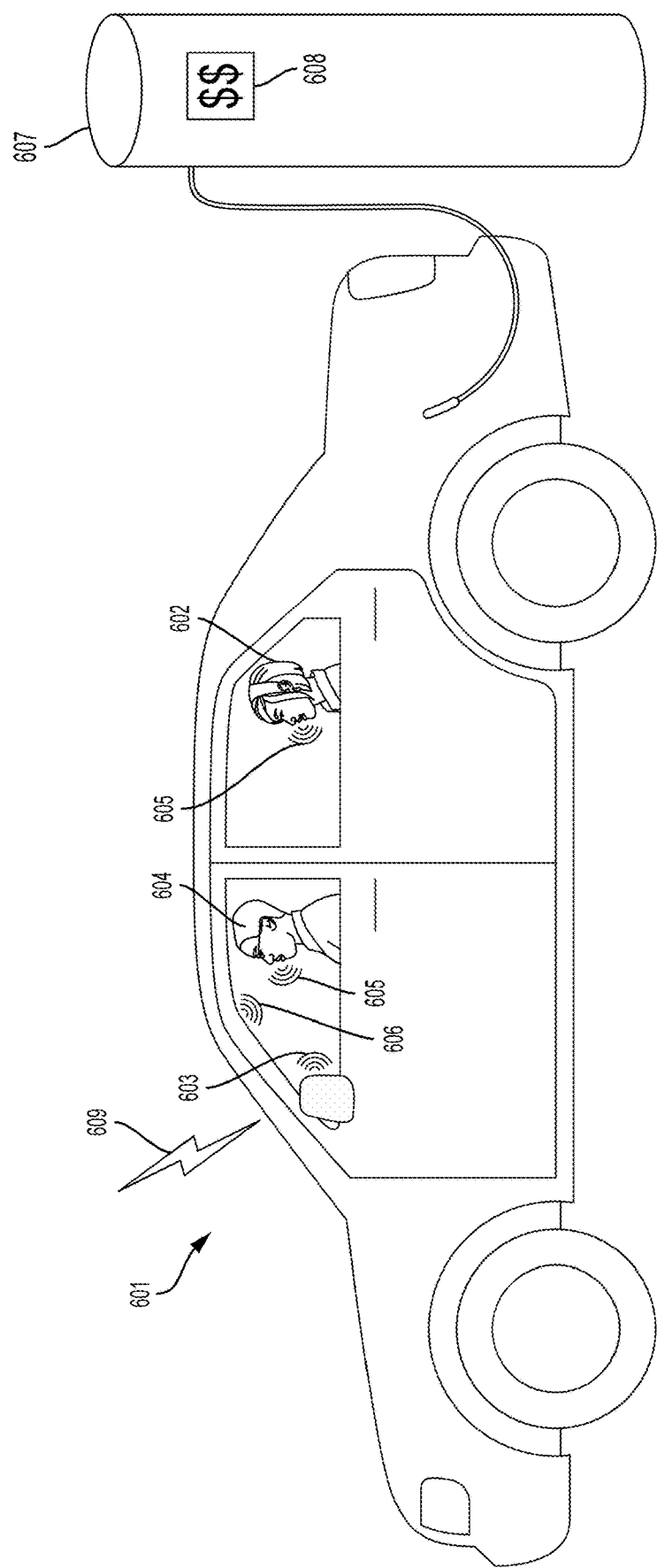
FIG. 6 is an illustration of a vehicle at a refueling or recharging station, the vehicle occupied by two users: a driver and a passenger.

FIG. 6 is an illustration of a vehicle at a refueling or recharging station. In an exemplary embodiment, a user 604 of an electric vehicle 601 arrives at a charging station 607. To authorize the charge 608, the user 604 communicates 605 with the AVPA via one or more vehicle-based data sources 606. Incorporating one or more cloud-based data sources 609, the AVPA asks via audio output 603, 'Today's charge will last 15 minutes and cost $21.67. Would you like to authorize the charge?' The user 604 responds, as appropriate. For security purposes, voice and facial recognition of the user 604 are performed by the AVPA with data from one or more vehicle-based 606 and cloud-based data sources 609 to confirm user identity. The user 604 can then couple the vehicle to the charging station 607 and begin the charge.

It should further not be implied that the vehicle must be user-operated. The above-described embodiments are not limiting and thus include autonomous and semi-autonomous vehicles. In another exemplary embodiment, the vehicle is an autonomous electric vehicle 601 with multiple users. The AVPA, having recognized a depleted electric charge from one or more vehicle-based data sources 606 and having evaluated user preference from one or more cloud-based data sources 609, notifies a user 604 that the charge is nearly depleted and recommends a nearby charging station 607 based on user preference. The user confirms the proposed charging station 607 and the vehicle navigates to the proposed location. Upon arrival at the charging station 607, another passenger 602 that is not the main user 604 of the vehicle offers to pay for the charge. The AVPA locates and identifies the passenger 602 using voice and facial recognition from one or more vehicle-based 606 and cloud-based data sources 609. Further, the AVPA confirms the charge authorization 608 with the passenger 602 via voice and facial recognition. The user 604 can now begin charging the vehicle. Charge authorization may be performed in a variety of secure ways, including but not limited to bank account linking, vehicle manufacturer smartphone application, and vehicle manufacturer account databases. Authorization may be performed by any user in the vehicle with a linked account, or the charge may be authorized by a plurality of users and divided, accordingly.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for acquiring cabin space information for a user of a vehicle, the method comprising:
   receiving at control circuitry data from one or more locally-based or cloud-based data sources, the data including a combination of real-time and stored data, wherein the data includes user-specific data related to prior user-vehicle interactions;
   evaluating the received data using the control circuitry, the control circuitry configured to interpret and contextualize the real-time data and the stored data to provide a notification regarding (i) a condition within the cabin space without the need for the user to make a direct observation of the condition, and (ii) a recommended action based on the prior user-vehicle interactions,
   wherein interpreting and contextualizing the real-time data and the stored data includes recognizing a change in a status of the vehicle based on the user modifying the status of the vehicle, querying the one or more locally-based data sources and cloud-based data sources to evaluate a current state of the user and the vehicle, anticipating the user's actions in a context of the current state of the vehicle, and identifying a potential situation including an error that the user should be made aware of in the context of the current state of the vehicle and predicted user actions; and
   communicating the notification including an alert with the error to the user within the cabin space via audio, visual, or a combination thereof.

2. The method of claim 1, wherein data from the one or more locally-based data sources include audio, video, touch, pressure, temperature, air composition, safety data, or a combination thereof.

3. The method of claim 2, wherein the audio and video data includes biometric data, and the biometric data includes at least one or more of vocal and facial signatures.

4. The method of claim 3, further comprising:
   determining the identity of the user from the biometric data.

5. The method of claim 4, wherein the determining step includes:
   comparing the biometric data with biometric data stored in a cloud-based user account.

6. The method of claim 1, wherein the cloud-based data sources include web searchable content.

7. The method of claim 1, wherein the cloud-based data sources include one or more cloud-based storage mediums containing user-specific data related to:
   the prior user-vehicle interactions; and
   cloud-based user accounts.

8. The method of claim 1, wherein the locally-based data sources reside in a vehicle.

9. The method of claim 1, wherein the notification is a response to a user query.

10. A virtual personal assistant embodied in one or more non-transitory machine readable storage media, executable by control circuitry, the control circuitry configured to:
    receive data from one or more locally-based or cloud-based data sources, the data including a combination of real-time and stored data, wherein the data includes user-specific data related to prior user-vehicle interactions;
    evaluating the received data to interpret and contextualize the real-time data and the stored data to provide a notification regarding (i) a condition within the cabin space without the need for the user to make a direct observation of the condition, and (ii) a recommended action based on the prior user-vehicle interactions,
    wherein interpreting and contextualizinu the real-time data and the stored data includes recognizing a change in a status of the vehicle based on the user modifying the status of the vehicle, querying the one or more locally-based data sources and cloud-based data sources to evaluate a current state of the user and the vehicle, anticipating the user's actions in a context of the current state of the vehicle, and identifying a potential situation including an error that the user should be made aware of in the context of the current state of the vehicle and predicted user actions; and
    communicating the notification to a user via audio, visual, or a combination thereof.

11. The virtual personal assistant of claim 10, wherein the received data are real-time and stored data specific to one or more vehicle users.

12. The virtual personal assistant of claim 10, wherein the notification is a response to a user query.

13. The virtual personal assistant of claim 10, wherein the locally-based data sources reside in a vehicle.

14. A virtual personal assistant embodied in one or more non-transitory machine readable storage media, executable by control circuitry, the control circuitry configured to:
    determine a change in vehicle state;
    evaluate data of one or more locally-based or cloud-based data sources, or a combination thereof, wherein the data includes user-specific data related to prior user-vehicle interactions;
    determine an anticipated user action in context of the vehicle state;
    determine whether a user of the vehicle should be notified of a predicted vehicle event as a function of the evaluation of the one or more locally-based or cloud-based data sources and the determined anticipated user action,
    wherein evaluating data of the one or more locally-based or cloud-based data sources includes recognizing a change in a status of the vehicle based on the user modifying the status of the vehicle, querying the one or more locally-based data sources and cloud-based data sources to evaluate a current state of the user and the vehicle, anticipating the user's actions in a context of the current state of the vehicle, and identifying a potential situation including an error that the user should be made aware of in the context of the current state of the vehicle and predicted user actions; and
    notify the user of the predicted vehicle event including a recommended action based on the prior user-vehicle interactions.

15. The virtual personal assistant of claim 14, further comprising:
    communicating with the user via audio, visual, tactile user interface, or a combination thereof, to determine a corrective course of action.

16. The virtual personal assistant of claim 14, wherein the locally-based data sources reside in a vehicle.

17. The virtual personal assistant of claim 14, wherein the locally-based and cloud-based data are real-time data and stored data, the real-time data and stored data being specific to one or more vehicle users.

18. The virtual personal assistant of claim 14, wherein the cloud-based data sources include cellular notifications.

19. The automotive virtual personal assistant of claim 5, executable by the processing system to allow user payment authorization via voice and facial recognition.

20. The automotive virtual personal assistant of claim 19, wherein the payment authorization is linked to a cloud-based user payment profile.

* * * * *